(12) United States Patent
Martin et al.

(10) Patent No.: US 6,513,446 B2
(45) Date of Patent: Feb. 4, 2003

(54) PROCESS AND APPARATUS FOR CONDITIONING MOIST AND DUST-LADEN INCINERATION AIR

(75) Inventors: Johannes Martin, München (DE); Horst Augstein, Haimhausen (DE); Henner-Siegbert Schloms, Altusried (DE)

(73) Assignee: Martin GmbH für Umwelt-und Energietechnik, Munich (DE)

( * ) Notice: Subject to any disclaimer, the term of this patent is extended or adjusted under 35 U.S.C. 154(b) by 0 days.

(21) Appl. No.: 09/998,585

(22) Filed: Nov. 16, 2001

(65) Prior Publication Data

US 2002/0062769 A1 May 30, 2002

(30) Foreign Application Priority Data

Nov. 27, 2000 (DE) .......................... 100 58 762

(51) Int. Cl.[7] .............................. F23B 7/00; F23L 15/00
(52) U.S. Cl. ....................................... 110/341; 110/303
(58) Field of Search ................................. 110/301, 302, 110/303, 304, 307, 308, 341, 348, 297

(56) References Cited

U.S. PATENT DOCUMENTS

| | | | | |
|---|---|---|---|---|
| 3,117,539 A | * | 1/1964 | Heyn | 110/56 |
| 3,148,665 A | * | 9/1964 | Switzer | 122/1 |
| 3,765,377 A | * | 10/1973 | Freiday | 122/7 C |
| 3,835,650 A | * | 9/1974 | Chesmejef | 60/690 |
| 4,129,176 A | * | 12/1978 | Heyn et al. | 165/7 |
| 4,205,630 A | * | 6/1980 | Regan | 122/1 R |
| 4,411,204 A | * | 10/1983 | Hamilton | 110/347 |
| 4,501,204 A | * | 2/1985 | McCartney | 110/264 |
| 5,241,916 A | * | 9/1993 | Martin | 110/348 |
| 5,634,412 A | * | 6/1997 | Martin et al. | 110/101 CA |
| 5,890,444 A | * | 4/1999 | Martin et al. | 110/346 |
| 6,067,916 A | * | 5/2000 | Martin et al. | 110/348 |

* cited by examiner

Primary Examiner—Ira S. Lazarus
Assistant Examiner—Kenneth B. Rinehart
(74) Attorney, Agent, or Firm—Cohen, Pontani, Lieberman & Pavane

(57) ABSTRACT

In an incineration plant with combination air being fed to its furnace via a pipeline, a mixing chamber, an extractor and an air-preheating device are provided in the direction of flow of the combination air. Heated air is fed from the air-preheating device into the mixing chamber, so that the sucked-in incineration air and, in particular, the moist dust particles entrained by it are dried.

8 Claims, 2 Drawing Sheets

PROCESS AND APPARATUS FOR CONDITIONING MOIST AND DUST-LADEN INCINERATION AIR

BACKGROUND OF THE INVENTION

1. Field of the Invention

The invention relates to a process for conditioning moist and dust-laden incineration air in incineration plants and, in particular, waste incineration plants, in which the incineration air is sucked in from a dust-containing and moist environment and is conveyed through an airpreheating device to the furnace. The invention also relates to an apparatus for carrying out the process.

2. Description of the Related Art

In the operation of incineration systems, in which the incineration air is sucked in from a dust-containing and moist environment, for example from the bunker for the waste substances in the case of waste incineration systems, there is the problem of the heat exchanger surfaces of the preheating devices used for the incineration air becoming soiled. Preheating devices of this type for the incineration air are used in order to preheat the incineration air for the furnace and therefore to improve the incineration process or to increase the efficiency. Heat is supplied by hot water or steam, which is generally produced in incineration plants of this type. Increasing soiling of preheating devices of this type for the incineration air causes a deterioration in the heat transfer between the heating surfaces of these devices and the incineration air to be heated and an increase in the flow resistance through these preheating devices for the incineration air, which leads to a rise in the driving power for the fan of the incineration air. In order to eliminate soiling of this type, cleaning devices, such as compressed-air or steam blowers, rotating cleaning brushes and bypass ducts to the preheating devices for the incineration air are provided. In this case, the bypass flow to the preheating device for the incineration air runs parallel to and in the same direction as the air flow through this air-preheating device. The deterioration of the incineration process or in the efficiency of the preheating device for the incineration air in bypass mode has to be accepted. The soiling is therefore not prevented or removed, but the necessary cleaning process is deferred just temporarily. This cleaning process has to be carried out at the latest when the power reserve of the fan has been exhausted.

This soiling of the preheating device for the incineration air, which is extremely annoying and is associated with the abovementioned disadvantages, is arrived at because the moist dust particles remain stuck to the hot heat exchanger surfaces. This moisture on the surface of the dust particles has various causes. One cause is that in spite of a dry surface the dust particles are still moist in the interior and during impact against the heat exchanger surfaces this moisture passes to the surface and moistens it again, which leads to the abovementioned sticking-on effect. A further cause can be found in that as the water on the surface of the dust particles evaporates the incineration air is cooled, which leads to the air which is to be preheated falling below a local dew point. However, when it falls below a dew point, moisture precipitates out of the air and this moisture then leads to the dust particles being moistened again, with the result that baking-on of these dust particles on the heat exchanger surfaces is unavoidable.

SUMMARY OF THE INVENTION

The object of the invention is to provide a process and an apparatus, with the aid of which the soiling of the preheating device for the incineration air can be largely avoided.

According to the invention, this object is achieved in a process of the type mentioned at the beginning by heated air being mixed with the sucked-in incineration air before its entry into the air-preheating device. This measure has at any rate the consequence of sufficiently drying the moist dust particles so that they no longer, or only to a very small extent, remain stuck to the heat exchanger surfaces of the air-preheating device. By this means, the problems explained at the beginning are largely or completely eliminated and therefore the overall efficiency of the incineration plant is ultimately also ensured.

In order to be able to implement the proposed process in a reproducible manner for large-scale incineration plants, it is advantageous, in a development of the invention, if at least one of the parameters comprising temperature, relative air humidity and pressure of the sucked-in incineration air is measured before and/or after the mixing in and is used as a regulating variable for determining at least one of the parameters comprising amount, temperature, relative air humidity and pressure of the heated mixing air. The temperature and the relative air humidity of the sucked-in incineration air is preferably measured before and after the heated air is mixed in and the necessary measures for the regulating process are derived therefrom. In particular, the amount of heated air to be mixed in is determined by this means.

In an advantageous manner, air from the air-preheating device is used as mixing air. In this connection, the air heated in the air-preheating device is branched off via a bypass and mixed with the sucked-in incineration air before its entry into the air-preheating device. In addition to obtaining the desired drying of the dust particles, this measure also has the further advantage that the dry dust particles contained in the heated incineration air become attached to those dust particles which have not yet dried completely, with the result that these dust particles which have not yet dried are surrounded by a layer of dried dust particles, which leads to a reduction in the tendency for them to bake onto the hot heat exchanger surfaces.

If the sucked-in incineration air is laden with dust to a particularly severe extent, it may be advantageous, after heated mixing air is fed to the sucked-in incineration air and before this mixed incineration air is introduced into the air-preheating device, to undertake dust removal. Dust particles which have already dried can be removed more unproblematically, for example through a filter, than moist dust particles.

An apparatus for carrying out the process is characterized in that within a mixing chamber there are arranged feed pipes for the mixing air, which pipes run transversely with respect to the direction of flow of the incineration air, are closed at the ends and have outlet openings for the mixing air. The heated mixing air emerges from the openings of the feed pipes and becomes uniformly mixed with the sucked-in incineration air flowing through the mixing chamber.

A preferred embodiment of the apparatus for mixing heated mixing air with the sucked-in incineration air is characterized in that each feed pipe is provided with three rows of air slots which are mutually offset by 120° in each case on the circumference, one row of air slots being provided on that side of the feed pipe which is placed in the main direction of flow of the incineration air, in that a casing which tapers conically in the main direction of flow of the incineration air is arranged on the feed pipe and forms a drop-shaped flow body together with the feed pipe, and in that a row of air slots are formed at the tapered end of the casing. In the abovementioned arrangement of rows of air slots, two rows of air slots are directed at an angle of 60° in each case counter to the main direction of flow of the sucked-in incineration air, with the result that mixing of the emerging, heated mixing air with the sucked-in incineration air takes place virtually by the counter-flow principle. The oblique setting of the blow-out direction of the two upper rows of air slots causes the sucked-in incineration air to be placed around the feed pipe and to be conducted away in a manner favourable in terms of flow through the arranged, conically tapering casing. By means of the arrangement of the air slots facing away in the direction of flow, the conically tapering casing is heated and bounds a chamber in which the dust particles entrained by the heated mixing air can precipitate. This fraction of the mixing air then emerges through the air slots arranged at the end of the tapered casing and then also carries along the removed dust particles. The casing surfaces form a heat exchanger surface for heating the sucked-in incineration air.

A preferred refinement of the apparatus is characterized in that the feed pipes are arranged within the mixing casing in a horizontal direction with the casings orientated downwards, and in that the direction of flow of the incineration air within the mixing chamber runs from the top downwards.

The invention will be explained in greater detail below with reference to an exemplary embodiment illustrated in the drawing, in which:

DETAILED DESCRIPTION OF THE PRESENTLY PREFERRED EMBODIMENTS

Figure 1:
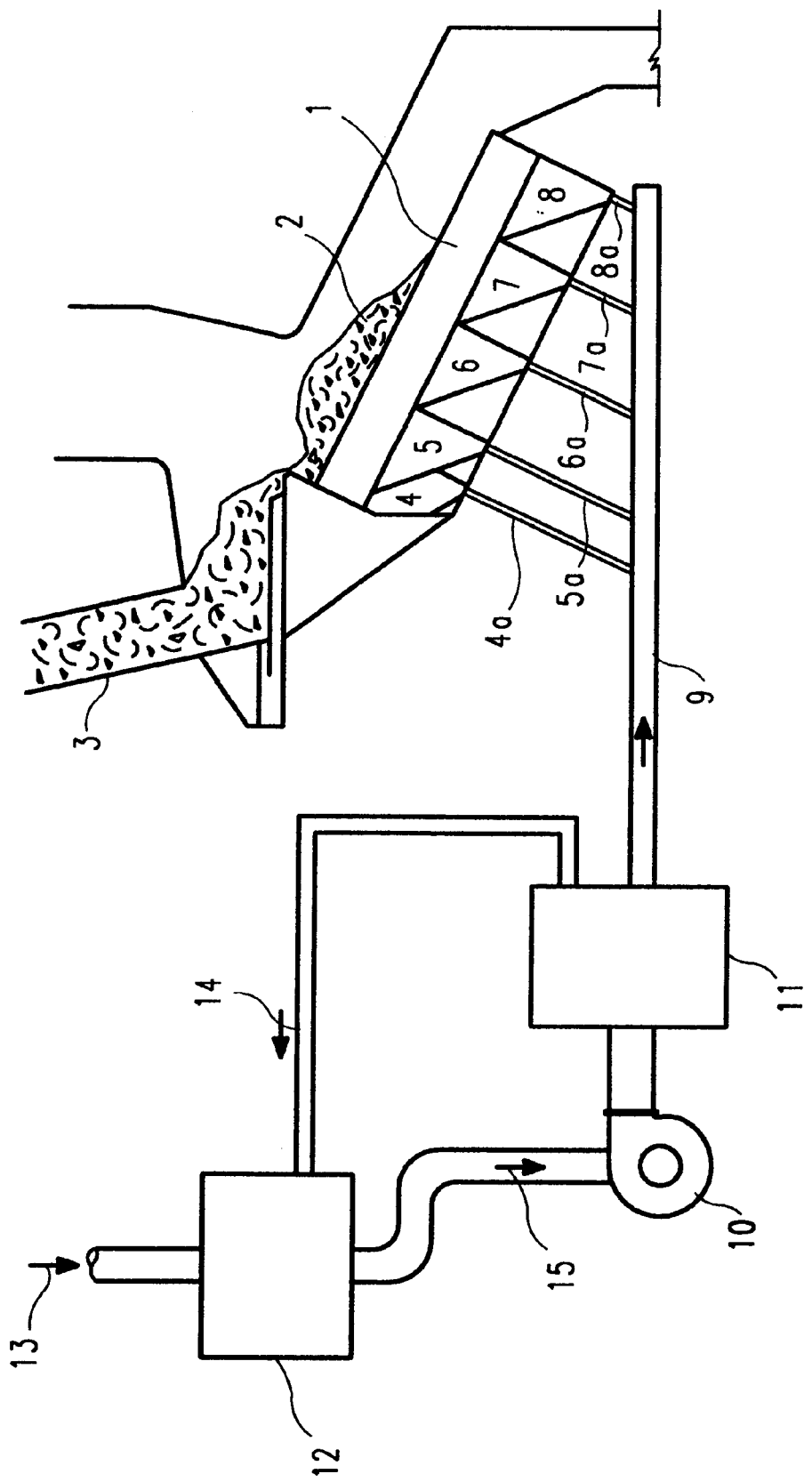
FIG. 1: shows a schematic view of an incineration plant for waste substances having an air-preheating device and an apparatus for mixing in heated air with the incineration air.

In the case of a waste incineration plant comprising a furnace 1, a combustion bed 2 of waste substances situated thereon, a feeding chute 3 and individual underblast chambers 4 to 8, incineration air from a collecting pipeline 9 is fed in via the individual distributor pipelines 4a to 8a. This incineration air is sucked in by means of an extractor 10 and pushed through an airpreheating device 11 in which the sucked-in incineration air is heated to approximately 140° C. So that it is not possible for this incineration air, which has been sucked in from a dust-containing and moist environment, to cause soiling of the air-preheating device 11, there is provided a mixing chamber 12 into which the sucked-in incineration air passes in the direction of the arrow 13. Heated air is branched off from the air-preheating device 11 into this mixing chamber 12 and is supplied to the mixing chamber in the direction of the arrow 14. The mixed air, which is sucked in by the extractor 10 and is then conveyed via the air-preheating device 11 to the furnace grate, leaves the mixing chamber in the direction of the arrow 15.

Figure 2:
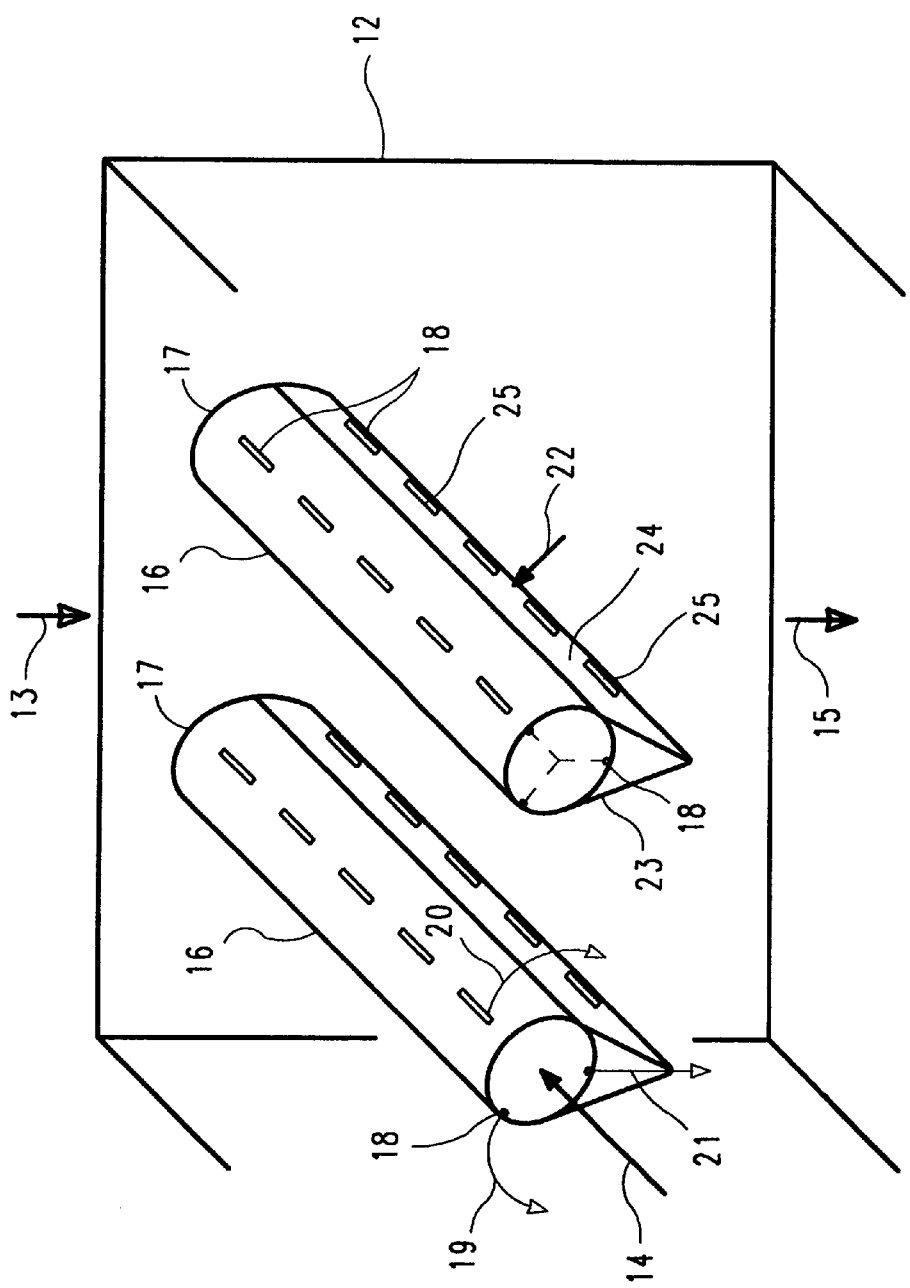
FIG. 2: shows a schematic illustration of the apparatus for mixing in heated air with the sucked-in incineration air.

As can be seen from FIG. 2, within the mixing chamber 12 feed pipe 16 are arranged transversely with respect to the main direction of flow of the sucked-in air, the main direction of flow running in a vertical direction from the top downwards, as indicated by the arrow 13 and the arrow 15. The feed pipes 16 are closed at their rear end 17 and have three rows of air outlet slots 18 which are distributed by 120° with respect to one another in each case on the circumference of the feed pipe 16. One row of air outlet slots 18 is arranged downwards in the vertical direction, i.e. on that side of the feed pipe 16 which faces away from the main direction of flow of the sucked-in combustion air. Accordingly, the two other rows of air outlet slots 18 are arranged inclined by 60° in each case with respect to the vertical, so that the hot mixing air which is fed in (indicated by the arrow 14) emerges from the feed pipe 16 in the direction of the arrows 19, 20 and 21. The flow arrows 19 and 20 are curved counter to and in the clockwise direction, which results from the mixing of the emerging hot mixing air with the sucked-in incineration air which is fed into the mixing chamber 12 in the direction of the arrow 13. The mixing air emerging at the lower side of the feed pipe 16 and denoted by the arrow 21 heats a casing 22 which is formed from two sheet-metal parts 23 and 24 which are positioned conically with respect to each other and form a dropshaped flow body in conjunction with each feed pipe 16, the casing 22 being orientated in the main direction of the flow in accordance with the arrows 13 and 15. The two casing surfaces 23 and 24, which are heated by the emerging, heated mixing air 21, serve as heat exchanger surfaces. The heated mixing air emerges from lower air slots 25 which are arranged at the lower end of the casing 22.

What is claimed is:

1. A process for conditioning moist and dust-laden combustion air in an incineration plant, said process comprising sucking in combustion air from a dust-containing and moist environment, conveying sucked-in combustion air through an air-preheating device to an incineration furnace, and mixing heated air with said sucked-in combustion air before conveying said combustion air to said preheating device.

2. A process as in claim 1 further comprising measuring at least one of the parameters comprising temperature, relative humidity, and pressure of the combustion air at least one of before and after mixing in heated air, and using said at least one of the parameters as a regulating variable for determining at least one of amount, temperature, relative humidity, and pressure of the heated air which is mixed with said sucked-in combustion air.

3. A process as in claim 1 said heated air is air from said air-preheating device.

4. A process as in claim 1 further comprising removing dust from said combustion air after mixing but before conveying to the air-preheating device.

5. An apparatus for conditioning moist and dust-laden combustion air in an incineration plant, said apparatus comprising a mixing chamber where combustion air is sucked in from a dust-containing and moist environment, said sucked-in combustion air having a flow direction, said mixing chamber having therein feed pipes which run transversely to the direction of flow, said feed pipes having closed ends and outlet openings, means for conveying sucked-in combustion air from said mixing chamber through an air-preheating device to an incineration furnace, and means for conveying heated air to said feed pipes for mixing with said suck-in combustion air.

6. An apparatus as in claim 5 wherein each said feed pipe has three rows of air slots which are mutually offset by 120 degrees circumferentially, each said pipe having a drop-shaped cross-section with a tapered end facing away from the flow direction of suck-in combustion air, one row of air slots being formed at said tapered end, one row of air slots facing said flow direction.

7. An apparatus as in claim 6 wherein said direction of flow is vertically downward, said feed pipes being arranged horizontally with said tapered ends facing downward.

8. An apparatus as in claim 5 wherein said means for conveying heated air to said feed pipes comprises a conduit from said air-preheating device to said mixing chamber.

* * * * *